United States Patent [19]

Taylor

[11] 4,028,966

[45] June 14, 1977

[54] ROTARY INDEX TABLE

[75] Inventor: Robert L. Taylor, Michigan Center, Mich.

[73] Assignee: Universal Vice & Tool Co., Parma, Mich.

[22] Filed: Dec. 19, 1975

[21] Appl. No.: 642,451

[52] U.S. Cl. ............................. 74/822; 74/813 C; 74/813 L; 74/827

[51] Int. Cl.² .................. B23B 29/24; B23Q 17/00

[58] Field of Search ................ 74/822, 827, 813 C, 74/813 L

[56] References Cited

UNITED STATES PATENTS

| | | | |
|---|---|---|---|
| 3,085,452 | 4/1963 | Thompson | 74/822 |
| 3,581,602 | 6/1971 | Bachmann | 74/822 |
| 3,888,140 | 6/1975 | Mackelvie | 74/822 X |

*Primary Examiner*—Leonard H. Gerin
*Attorney, Agent, or Firm*—Beaman & Beaman

[57] ABSTRACT

A rotary index table wherein a detent oscillating about the table axis of rotation is translated radially inwardly during indexing and retracted radially outwardly during the return stroke of the detent, both actions being accomplished through a positive acting toggle link arrangement. The positive detent engagement with the table during indexing prevents table overtravel, and a locking detent is utilized to produce final table orientation. The table also includes expansible chamber motor means axially translating the table into a frictional locking engagement with its base.

13 Claims, 9 Drawing Figures

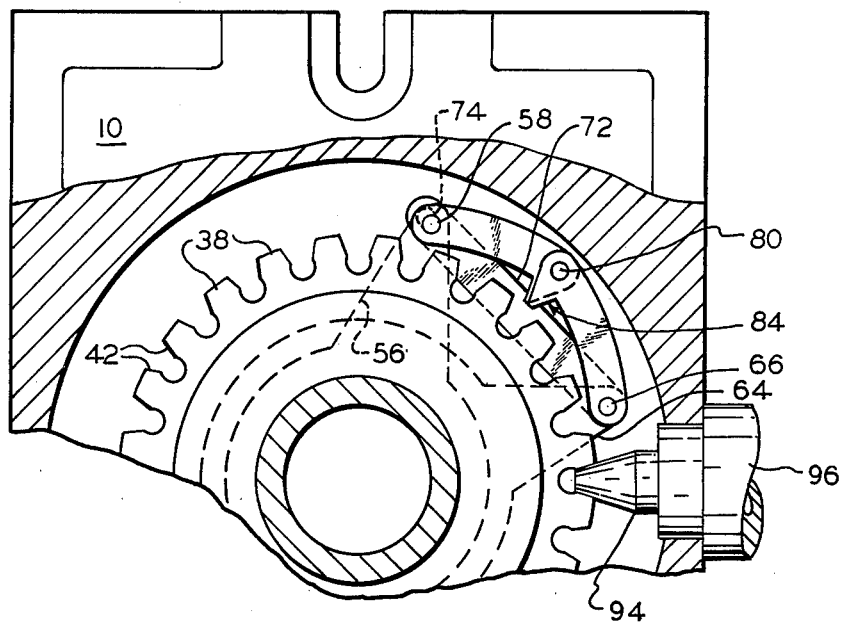
FIG. 5.
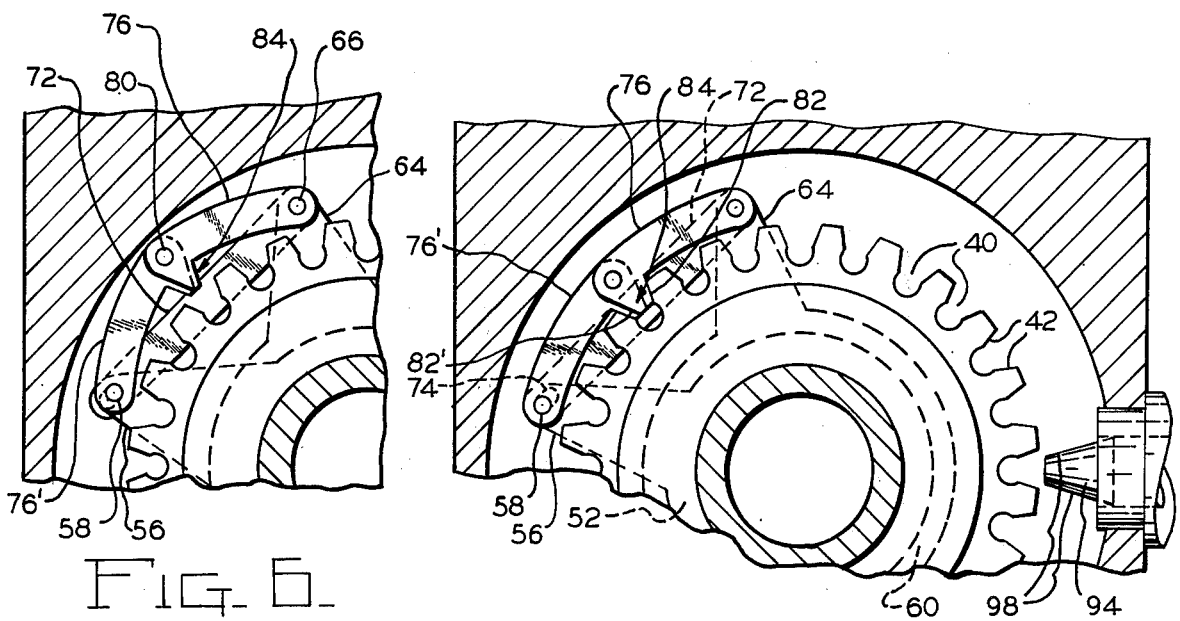
FIG. 6.
FIG. 7.
FIG. 8.
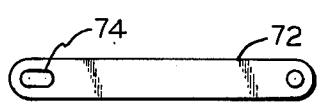
FIG. 9.

ROTARY INDEX TABLE

BACKGROUND OF THE INVENTION

The invention pertains to rotary indexing tables such as employed in the machining and fabrication arts.

Rotary index tables are commonly employed with machine tools, such as milling machines and turret lathes, assembly apparatus, bottle filling machines, and the like, wherein the table is periodically indexed about its axis of rotation for sequentially presenting a station or part to a tool, or nozzle, or other similar fixture. The rotation of the index table may be manually accomplished, or power driven such as by a rotary or reciprocating motor which may be electric or fluid powered. The most conventional system for indexing an index table is to utilize a ratchet wheel having teeth defined thereon which are selectively engaged by a ratchet dog, usually pivotally mounted and often spring biased, which engages with the wheel as the dog oscillates about the table axis of rotation in the indexing direction. As the dog is oscillated in the return direction it rides over the teeth of the ratchet wheel, and adjustable means are often associated with the ratchet dog linkage to limit the angular degree of dog movement about the table axis in order to vary the extent of table rotation.

Indexing devices utilizing pivoted ratchet dogs produce a positive engagement between the table ratchet wheel and dog in only the direction of rotation when the dog is rotating the wheel. Indexing tables must be indexed precisely to predetermined positions. Thus, it is necessary for the ratchet dog to move the index table to the predetermined rotational location, and no further. However, with most of the high speed machine tools and apparatus presently being utilized it is necessary to rotate the index table rapidly, and accurate location of the index table at its termination of rotation in the indexing direction becomes difficult due to the inertia of the table while rotating.

The inertia of the index table tends to continue table rotation after the positive driving of the table by the ratchet dog has ceased. Such "carry-over" of the index table and ratchet wheel past the desired table location is possible because the engagement of the ratchet dog with the ratchet wheel is unidirectional, and the dog cannot prevent rotation of the table ratchet wheel past the desired location as the ratchet dog merely "rides over" the ratchet wheel teeth.

In order that the index wheel and table be accurately located, a radially displaceable index pin or lock is often utilized to position and hold the index table intermediate indexing cycles. It is possible to sequence the operation of a power driven index lock such as to "catch" the index table at the end of its indexing movement to accurately locate the table. However, such an abrupt termination of the table movement as produced by an abutting relationship between table structure and a locating detent imposes undesirable and sudden shocks and impacts upon the index table and locating detent, creating high wear with the likelihood of fracturing the detent, or "peening" the table structure engaged by the locating detent.

While the locating detents of the prior art are capable of accurately predetermining and maintaining the rotational position of the index table relative to its axis of rotation, such locating detents do not usually provide such a degree of interconnection between the index table and its base as to prevent vibration between the table and base, and locking means are often utilized with the table for positively locking the table with respect to its base during functioning of the apparatus mounted upon the table. For instance, if the index table supports a workpiece machined by a milling machine, it is most desirable to firmly lock the index table to its base during such machining in order to prevent inaccuracies developing in the workpiece due to slight movement and vibrations existing between the table and base.

Previously utilized index table locks are often manual, requiring separate attention and operation as compared with the index table operating controls. While expansible motors have been utilized to lock index tables to their base, prior art holding means do not produce symmetric hold-down forces upon the index table, and are expensive and incapable of producing optimum holding forces in a minimum space and configuration.

SUMMARY OF THE INVENTION

It is an object of the invention to provide a rotary index table having an indexing detent oscillating about the table axis of rotation, and capable of engaging the index table components so as to establish a positive driving connection therewith during indexing which will prevent "overtravel" and will overcome inertial forces preventing the same from producing overtravel of the index table past its desired degree of indexing rotation.

An additional object of the invention is to provide a rotary index table having a positively operated indexing detent which radially moves inwardly during rotation in the indexing direction to firmly engage a recess within the table index wheel structure to prevent play or clearance between the detent and recess during interengagement.

Another object of the invention is to provide a rotary index table utilizing a positive indexing structure which is of an economical construction to produce, and is dependable in operation.

Yet a further advantage of the invention lies in the provision of the incorporation of an expansible motor within the base of the index table capable of imposing an axial force upon the table to provide a high frictional engagement between the table and the base preventing vibration between the table and base.

In the practice of the invention the rotary table includes a wheel portion having detent receiving recesses radially oriented and defined upon the periphery of the wheel portion. A detent support rotatable about the table axis consists of a pair of members relatively movable a limited degree with respect to each other through a lost motion linkage. These members each support a toggle link, the toggle linkages being pivotally interconnected at their central region and each linkage defining a portion of a detent. One of the detent support members is rotated by power means, and the relative movement between the support members radially displaces the detent portions of the toggle linkage into and out of engagement with the table detent receiving wheel portion. As the detent portions are positively brought into engagement with a table defined recess, and are of such configuration as to prevent disengagement of the detent with the recess at the termination of indexing, a positive interrelationship between the detent and index table occurs completely throughout the indexing movement of the detent support. Upon reversal of the direction of rotation of the detent support, the toggle linkage movement withdraws the detent from its associated recess and permits the detent to be oscillated in the reverse direction in order to initiate the next indexing cycle.

Frictional engagement between the index table and its base is accomplished through an annular expansible chamber motor circumscribing the index table shaft, and the index wheel affixed to the shaft constitutes a piston member cooperating with the expansible motor chamber cylinder. A pressurized fluid source communicating with the cylinder chamber through valve means selectively permits pressurization of the chamber, and such pressurization produces an axial force upon the table shaft which creates a high frictional engagement between the index table and the table supporting surface defined upon the table base. Such engagement between the table and base is sufficient to overcome relative movement therebetween due to machining vibrations, and the like, and the incorporation of the expansible hold-down motor into the base produces uniform frictional forces on the table minimizing inaccuracies due to warpage or asymmetrical forces.

BRIEF DESCRIPTION OF THE DRAWING

The aforementioned objects and advantages of the invention will be appreciated from the following description and accompanying drawings wherein:

FIG. 5 is a plan, partially sectioned, detail view of the index wheel and detent linkage illustrating the detent at the end of the indexing motion and after initial movement of the detent support, but prior to rotation of the detent occurring, FIG. 6 is a plan, detail view of the detent linkage while being rotated in the return direction, FIG. 7 is a plan, detail view of the index wheel and detent after engagement of the detent with the index wheel and prior to rotation of the detent support in the indexing direction, FIG. 8 is a plan view of a detent toggle linkage, and FIG. 9 is a plan view of the lost motion producing link.

DESCRIPTION OF THE PREFERRED EMBODIMENT

Figure 1:
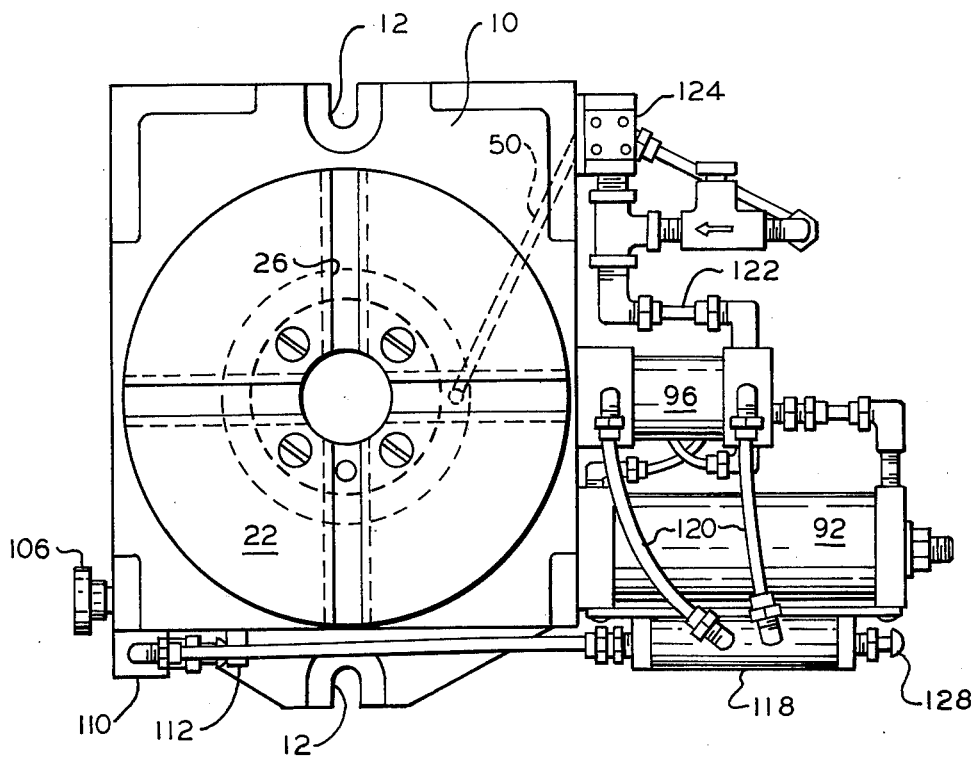
FIG. 1 is a top elevational view of an index table in accord with the invention.
Figure 2:
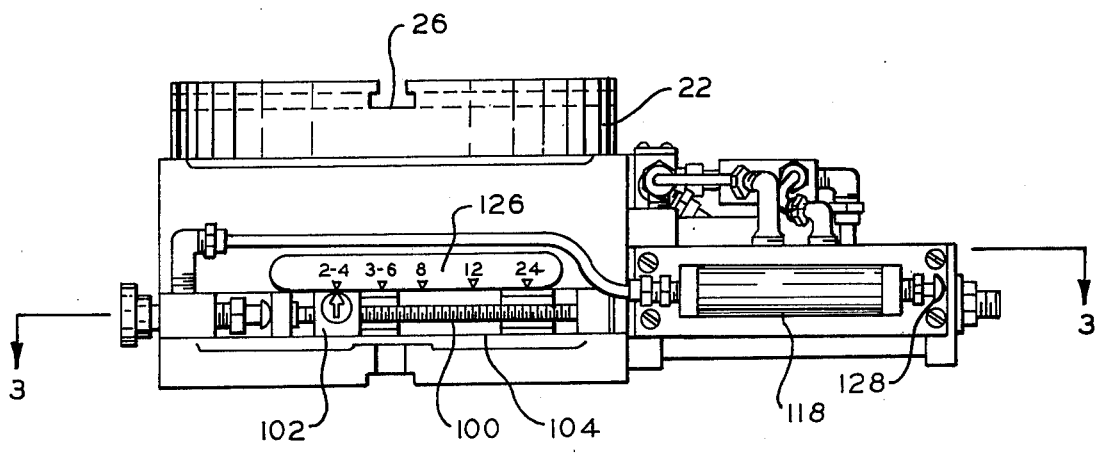
FIG. 2 is a side elevational view as taken from the bottom of Fig. 1.
Figure 4:
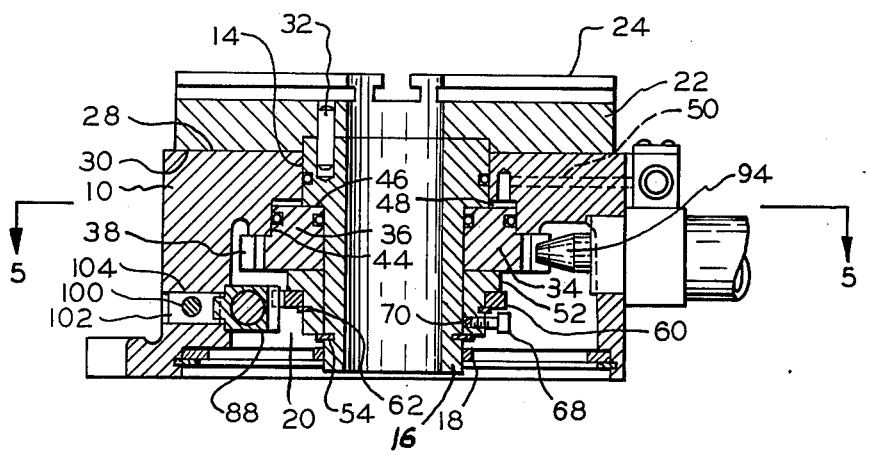
FIG. 4 is an elevational, detail, sectional view taken along right angled section B—B of FIG. 3.

The basic components of an index table in accord with the inventive concept will be best appreciated from FIGS. 1, 2 and 4. The structure includes a base 10, usually of a cast metal of relatively heavy weight, and as the disclosed index table is particularly suitable for use in machine tools, such as milling or drilling machines, the base is provided with a flat lower supporting surface and hold-down bolt receiving notches 12 whereby the base may be firmly attached to a machine tool table.

The base includes a vertically disposed bore 14, FIG. 4, defining a bearing surface for the tubular table shaft 16, and the lower portion of the shaft is supported within the base bearing 18. The operating mechanism for the index table is located within a chamber 20 defined within the base, and the structure located therein will be described below.

The table 22 is of a generally cylindrical configuration having an upper surface 24 provided with perpendicularly disposed T-bolt receiving grooves 26, as is conventional with machine tool index tables. The lower surface 28 of the table is flat and engages the upper flat surface 30 of the base whereby the base surface 30 is capable of supporting the weight of the table. The table 22 is firmly affixed to the upper end of the shaft 16 by pins 32 whereby the shaft and table rotate together about the shaft axis.

An index wheel 34 is affixed to the shaft 16 by a key or spline and, as apparent in FIG. 4, the index wheel includes a cylindrical portion 36 and a toothed portion of greater diametrical dimension having a plurality of teeth 38 defining recesses 40 on the index wheel periphery. The recesses are formed by opposed surfaces 42 which are substantially flat and converge in an inward direction toward the axis of the shaft 16.

As apparent in FIG. 4, the base 10 is provided with a cylindrical surface 44 which closely slidably receives the index wheel portion 36, and the base radial surface 46 is disposed above the upper surface of the index wheel portion whereby a chamber 48 is defined. The chamber 48 communicates with a source of pressurized fluid through a bore 50 defined in the base as represented by the dotted lines in FIG. 1.

Detent support means are also mounted upon the shaft 16 and include a member 52 having an annular hub portion, FIG. 4, rotatably mounted on the shaft and maintained adjacent the index wheel 34 by a snap ring 54 received within a groove defined upon the shaft. The member 52 includes a radially extending arm 56, FIG. 3, having a pivot pin 58 located at its outer end.

The hub portion of member 52 includes a cylindrical surface upon which the detent support member 60 is rotatably mounted, and positioned thereon between the hub shoulder and a snap ring 62. The member 60 is rotatably supported upon the member 52 and includes a radially extending arm 64, FIG. 3, having a pivot pin 66 located at its outer end.

A friction set screw 68, FIG. 4, is threadedly received within a radial bore defined in the member 52 and engages a friction block 70 of resilient material, such as a synthetic plastic or rubber, wherein tightening of the set screw forces the friction block against the shaft 16 producing a frictional mounting of the member 52 upon the shaft which may be varied as desired.

The pivot pins 58 and 66 of the detent support member arms are interconnected by a lost motion link 72, FIG. 9. The link 72 includes a hole for receiving the pivot pin 66, and the other end of the link includes an elongated slot 74 through which the pin 58 extends.

The arms 56 and 64 are also interconnected by a toggle linkage consisting of a pair of links 76 and 76' indentical in configuration, the shape thereof being apparent from FIG. 8. The toggle links 76 and 76' each include, at one end, a hole for receiving the associated pivot pin 58 or 66. At the other end of the toggle linkage a hole 78 is defined whereby the toggle links may be pivotally interconnected together by a pivot pin 80, FIG. 5. Also, each toggle linkage is provided with a detent projection 82 and 82' which extends radially inward toward the shaft axis and each includes a surface 84 and 84' for engagement with the index wheel recess surfaces 42, as later described.

The length of the links 76 is so related to the length of the link 72 that relative rotation of movement between the members 52 and 60, as limited by the movement of the pin 58 within the slot 74, will radially displace the detent 84, collectively defined by the projections 82 and 82', between the radial positions shown in FIGS. 6 and 7. In FIG. 6 the minimum distance between the arms 56 and 64 is illustrated, wherein the pin 58 is at the rightmost portion of the slot 74, and this relationship moves the pivot pin 80 and detent 84 radially outward its maximum degree. When the pin 58 is in the leftmost portion of the slot 74 the toggle links 76 are "stretched" moving the detent 84 inwardly as in FIG. 7, whereby the detent may engage an index wheel recess 40. As will be appreciated from FIG. 7, when the detent 84 is in its innermost position the pivot pin 80 lies radially outside a line interconnecting the pivots 58 and 66 and, thus, the detent will always move radially outward upon the arms 56 and 64 moving toward each other.

Figure 3:
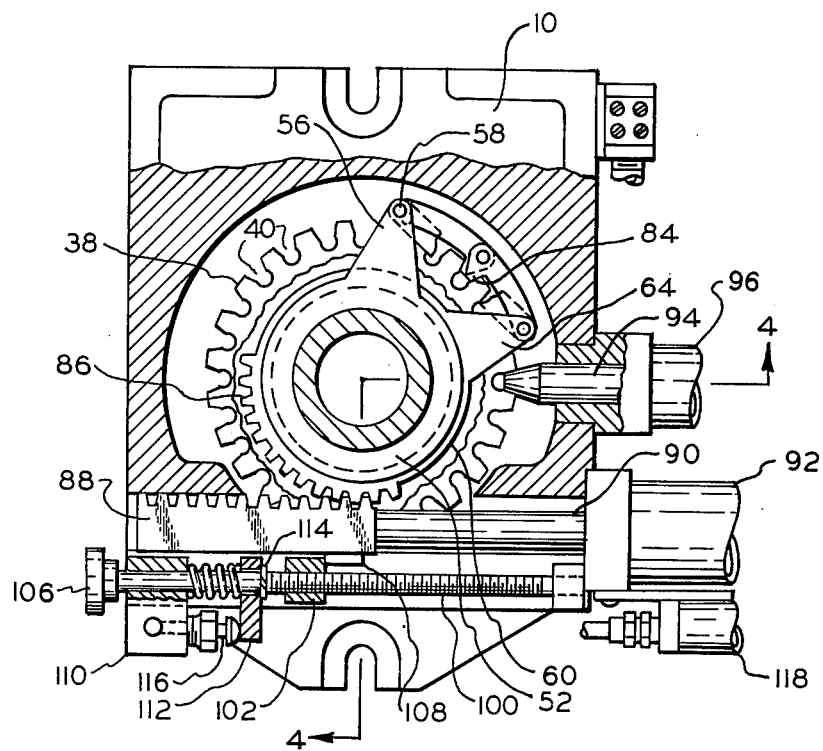
FIG. 3 is a plan, partially sectioned view as taken along section A—A of Fig. 2.

Rotation of the detent support member 60 is achieved by a plurality of gear teeth 86 defined thereon, as apparent in FIG. 3. The gear teeth 86 mesh with the toothed rack 88 slidably supported upon a guideway within the base 10 and operably connected to the piston 90 of an expansible motor 92, preferably air operated. Thus, reciprocation of the piston 90 and rack 88 will oscillate the support members 60 and 52 about the axis of shaft 16.

When the rack 88 is moved to the right, as shown in FIG. 3, as the piston retracts, the member 60 will be rotated in a counterclockwise direction. This counterclockwise movement will cause the link 72 to move to the left locating pivot pin 58 at the right end of the slot 74 and the link 72 will then "push" the member 52 in a counterclockwise direction about the shaft 16. When the distance between the arms 56 and 64 is thus "shortened," the toggle links 76 and 76' will be pivoted outwardly, moving the detent 84 out of its associated index wheel recess, as shown in FIG. 5.

When the rack 88 is moved to the left, as shown in FIG. 3, the link 72 will then "pull" the member 52 in a clockwise direction, locating the pin 58 in the left end of the slot 74, as shown in FIG. 7, and the detent 84 will radially move inward into one of the index wheel recesses 40.

As the member 52 is frictionally mounted on the shaft 16 by means of the set screw 68 and friction block 70 the aforedescribed relative movement between the members 52 and 60 is dependably achieved.

Accurate rotational location of the table 22 is produced by the locating detent 94 mounted in the base and radially movable into engagement with an index wheel recess 40, FIG. 5, and out of engagement with the index wheel as represented in FIG. 7. The radial displacement of the locating detent 94 is achieved by an expansible motor 96, the detent constituting an extension of the motor piston, and the detent is provided with converging surfaces 98 for corresponding intimate engagement with the recess surfaces 42.

The rotational extent of oscillation of the support members 52 and 60 and, thus, the rotation of the table 22, is controlled by a threaded rod 100 rotatably mounted upon the base 10 upon suitable journals which also permit axial displacement. An abutment block 102 is provided with a threaded bore and located upon the rod 100 and partially extends into the base slot 104 whereby rotation of the rod by the knob 106 axially positions the block on the rod. Block 102 is engaged by a boss 108 defined upon the rack 88 wherein engagement of the boss with the abutment block 102, as the rack moves to the left, will displace the rod 100 to the left. Shaft movement is sensed by a valve 110 through an arm 112 mounted on rod 100 and spring biased against rod shoulder 114. Arm 112 extends through slot 104 for engaging the valve actuating plunger 116. Movement of the rack to the right is limited by the dimensions of the motor 92 itself, or other stop mechanism, not shown. The valve 110 controls the actuation of a valve 118 which controls the supply of pressurized fluid to the motor 92 and, thus, by rotation of the knob 106, the degree of index table rotation may be readily varied such that the indexing of the table 22 may vary between the distance between adjacent recesses 40 to a maximum of 90°.

As appreciated from FIG. 1, conduits 120 connect the locating detent motor 96 to the control valve 118, and conduit 122 connects fitting 124 to motor 96. Fitting 124 communicates with the bore 50 for locking the table against the base, as described below. The motors 92 and 96 and valve mechanism constitute no part of the invention and may be of a conventional nature.

As shown in FIG. 2, indicia 126 may be defined upon the base 10 for correlation to an indicator mark formed on the abutment block 102 wherein location of the abutment block will be readily apparent to the operator so that he may determine the degree of table indexing which will be produced each cycle.

In use, assuming the table to be stationary, the locating detent 94 will be engaging a recess 40, as shown in FIG. 3, and the detent 84 will also be in engagement with a recess 40, as illustrated, since the indexing movement has been completed. Also the chamber 48 will be pressurized, forcing the index wheel "piston" portion 36 downwardly which draws the table 22 downwardly toward the base to firmly engage the table surface 28 with the base surface 30 with a high frictional force locking the table with respect to the base wherein vibrational movement between the table and base is eliminated.

When it is desired to index the table 22 the valve button 128 in valve 118, FIG. 1, is depressed. Such operation of the valve bottom may be achieved automatically by the machine tool or other machinery associated with the index table, or the button may be manually actuated. Valve actuation pressurizes the motor 92 retracting the piston 90 and moving the rack 88 to the right, FIG. 3.

The initial rotation of the member 60 by the rack 88 locates the pin 58 at the right end of the slot 74, as shown in FIG. 5, moving the detent 84 outwardly from the index wheel recess 40 previously engaged. Continued movement of the rack 88 to the right rotates both members 52 and 60 and associated detent toggle linkages and link 72 counterclockwise to the maximum extent, as determined by the retraction of the piston 90 within the motor 92. This location is predetermined to align the detent 84 with a recess 40, FIG. 6, and thereupon the motor 92 automatically reverses its direction of movement moving the rack 88 to the left, FIG. 3. Simultaneous with the pressurization of the motor 92 to reverse direction, the motor 96 is energized to withdraw the locating detent 94 from its associated recess, and the chamber 48 is depressurized. Such initial reversal of direction will cause the pin 58 to be located at the outermost part of the slot 74 pulling the detent 84 inwardly for engagement with the aligned recess 40, as shown in Fig. 7. Continued movement of the rack to the left moves the members 52 and 60 and index wheel 34 clockwise and such clockwise movement continues until the boss 108 engages the abutment block 102 to actuate the valve 110 and, at this time, the motor 92 is depressurized, the locating detent 94 is energized to engage a recess 40 and lock the index wheel and table against further rotation and, simultaneously, the chamber 48 is pressurized frictionally engaging the table and base surfaces 28 and 30, and the indexing cycle is completed.

During rotation of the index wheel 34 by the detent 84 in the clockwise indexing direction the detent will be maintained in engagement with the "forward" recess surface 42 as the angle of the detent and recess surfaces constitute a "locking" angle which prevents the detent from riding out of the associated recess. Also, the fact that the detent 84 is defined by two projections 82 and 82' the circumferential distance between the inner portions of the projections will increase upon the radial position of the detent decreasing due to the fact that the toggle linkages pivot about the pivot 80. Thus, as detent 84 moves inwardly from the position of FIG. 6 with the position of FIG. 7, both the surfaces 42 of the aligned recess will be engaged by the detent projections, and no clearance or play exists relative to the detent and associated recess, which is important to assure accurate locating of the index wheel and table by the detent 84 during the indexing movement.

Due to the accurate and firm engagement of the detent 84 and the recesses 40, "overtravel" of the index wheel and table is prevented regardless of how fast the table is being rotated by the motor 92 and the locating detent 94 does not engage its recess until rotation of the index wheel and table has stopped. Thus, the accuracy of indexing, as achieved by the locating detent 94, will be maintained for an extended period as little wear occurs between the locating detent and the recess surfaces 42.

It will be appreciated that the aforedescribed structure and operation produces a rotary index table capable of quick and accurate indexing wherein the table may be used for close tolerance machining operations, and it is to be understood that various modifications may be apparent to those skilled in the art without departing from the spirit and scope of the invention.

I claim:

1. A rotary index table comprising, in combination, a base, a table rotatably mounted upon said base for rotation about an axis, an index wheel operatively connected to said table for rotation therewith about said axis having a periphery, a plurality of radially oriented detent receiving recesses defined on said periphery evenly spaced thereabout, detent support means mounted for rotation about said axis, a detent, mounting mean mounting said detent upon said support means permitting radial displacement of said detent with respect to said axis for selective engagement of said detent with one of said recesses, drive means connected to said support means for reversibly oscillating said support means about said axis in indexing and return directions, said mounting means radially displacing said detent inwardly for engagement with a recess during rotation of said support means in said indexing direction and radially displacing said detent outward from engagement with said recesses during rotation of said support means in said reversing direction.

2. In a rotary index table as in claim 1, a locating detent mounted on said base for selective radial movement with respect to said axis between recess engaging and disengaging positions, operating means for displacing said locating detent between said positions, said locating detent preventing rotation of said table when engaging a recess, and synchronizing means synchronizing operation of said drive means and said locating detent operating means whereby said locating detent engages a recess during oscillation of said support means in the return direction and while stationary and disengages from said recesses during oscillation of said support means in the indexing direction.

3. In a rotary index table as in claim 2 wherein said drive means for said support means and said operating means for said locating detent comprise motor means and said synchronizing means comprises motor control means.

4. In a rotary index table as in claim 3 wherein said motor means comprise expansible chamber motors and said sychronizing means comprises valve means.

5. In a rotary index table as in claim 1 wherein said detent support means comprises first and second members, means drivingly connecting said first member to said drive means, said second member being rotatably mounted with respect to said first member for rotation about said axis, a lost motion linkage interconnecting said members for rotation in a common direction, a toggle linkage interconnecting said members having a central pivot radially movable toward and away from said axis depending on the direction of rotation of said members, said detent being mounted upon said toggle linkage adjacent said central pivot.

6. In a rotary index table as in claim 5 wherein said detent comprises a homogeneous projection defined on said toggle linkage extending toward said axis.

7. In a rotary index table as in claim 6 wherein said toggle linkage consists of two elements, a homogeneous projection being defined upon each element, said projections being so related to said toggle linkage central pivot that said projections move away from each other in the circumferential direction of said index wheel to circumferentially expand said detent into firm engagement with the associated recess when said support member is rotated in its indexing direction.

8. In a rotary index table as in claim 5 wherein said index wheel recesses are partially defined by a detent engaging locking surface, a locking surface defined on said detent engageable with said recess locking surface during rotation of said support member in said indexing direction, engagement of said locking surfaces preventing outward radial displacement of said detent from the associated recess during rotation of said index wheel by said detent in said indexing direction.

9. A rotary index table comprising, in combination, a base, a table rotatably mounted upon said base for rotation about an axis, means for indexing said table about said axis, a flat first surface defined on said base engaging said table, and transversely oriented to said axis, a flat second surface defined on said table engaging said first surface, an expansible fluid motor having cylinder and piston elements, respectively, connected to said base and table, and a source of pressurized fluid selectively communicating with said motor whereby pressurization of said motor axially translates said table relative to said base to frictionally engage said surfaces and frictionally lock said table with respect to said base.

10. In a rotary index table as in claim 9, a shaft rotatably mounted within said base, said index table being mounted on said shaft, an annular piston element encircling said shaft and affixed thereto, and a cylinder chamber defined in said base receiving said piston element.

11. In a rotary index table as in claim 9, an index wheel affixed to said shaft, intersecting cylindrical and radial surfaces defined on said index wheel, said cylindrical and radial surfaces defining said piston element.

12. In a rotary index table as in claim 9, a workpiece attachment surface defined on said table transversely disposed to said axis, said second surface being substantially parallel to said attachment surface and located on the opposite side of said table.

13. In a rotary index table as in claim 9 wherein said means for indexing said table comprises a fluid motor, a first valve controlling operation of said fluid motor, a second valve controlling operation of said fluid motor connected to said base and table, and means synchronizing operation of said valves to release frictional engagement between said first and second surfaces during indexing of said table.

* * * * *